C. H. KOENIG.
GLIDER.
APPLICATION FILED JUNE 17, 1911.

1,067,039.

Patented July 8, 1913.

Witnesses:

Inventor
Charles H. Koenig.
By Attorneys
Victor J. Evans

UNITED STATES PATENT OFFICE.

CHARLES H. KOENIG, OF NEW YORK, N. Y.

GLIDER.

1,067,039.

Specification of Letters Patent.

Patented July 8, 1913.

Application filed June 17, 1911. Serial No. 633,727.

*To all whom it may concern:*

Be it known that I, CHARLES H. KOENIG, a citizen of the United States, residing at New York, in the county of New York and State of New York, have invented new and useful Improvements in Gliders, of which the following is a specification.

This invention relates to gliders and particularly to a device which may be strapped to one foot of the operator whereby the other foot may be used as a propelling medium, further, the provision of supporting surfaces in the form of knobs which are so arranged as to reduce the friction between the glider and the surface over which the same is traveling.

Figure 1:
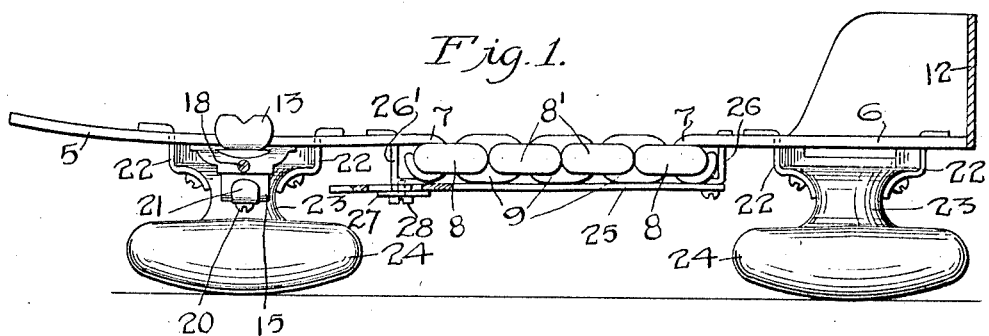
Figure 2:
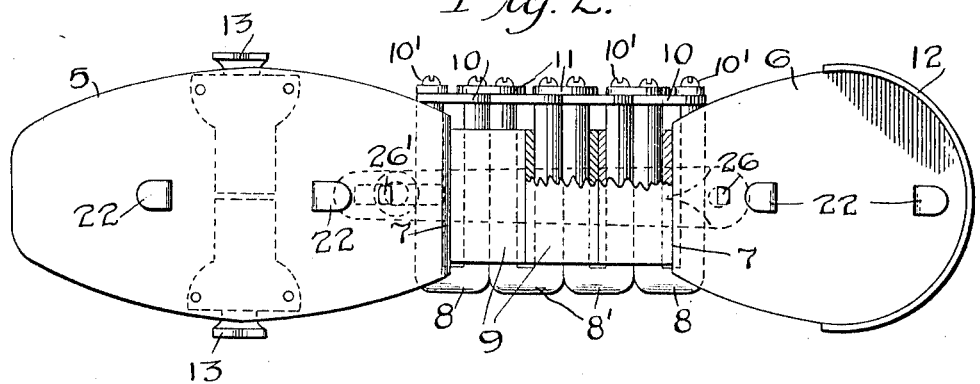
Figure 3:
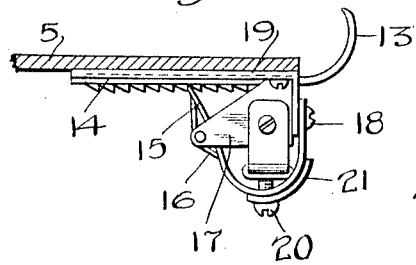
Figure 4:
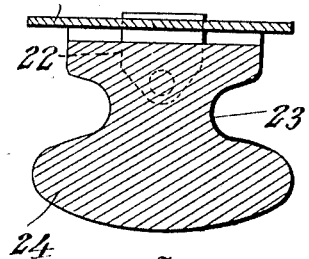

Figure 1 is a side elevation of the glider. Fig. 2 is a plan view of same. Fig. 3 is a detail view of one of the clamps. Fig. 4 is a sectional view through one of the knobs.

The glider consists of a base made of two sections 5 and 6, each section having a tubular end 7 to receive one arm of a U shaped link 8. The intermediate legs 8' are united by tubes 9 while the outer ends of the links are united by plates 10, retained by means of outer plates 11, and screws 10'. This provides a flexible base which yields with the movement of the foot of the user and the usual heel guard 12 is attached to the section 6 while the front section 5 has at each side a clamp 13 consisting of plates 14 having ratchet teeth on their lower faces to be engaged by a spring pawl 15 pressed into engagement by supports 16, pivoted in brackets 17. As shown in Fig. 3, the pawl 15 is made of spring metal and secured by means of a screw 18 to a guide-way 19 in which the clamp slides. The pawl is adjusted by means of a screw 20 and washer 21.

In attaching the glider to the shoe, the clamp 13 is pressed inward and locked by means of the pawl 15, but it may be released by loosening the screw 20 so as to remove the pawl ratchet 15 from engagement with the teeth 14.

To each of the sections 5 and 6 are secured downwardly extending L shaped springs 22 to which are secured the stems 23 of the knobs or runners 24, and as they present a minimum surface to the ice or skating surface, the movement of the wearer over the said surface is comparatively easy.

The links 8 are made horizontally rigid by means of a spring 25, which is secured to a bracket 26 and rests upon the tubes 9. The free end of the spring is slotted to contain the hub of a washer 27 and through the washer passes a screw 28 which enters the bracket 26. The spring is allowed to yield yet the forward end is held so as to cause the pressure of the spring on the tubes as above described. This spring may be of any degrees of rigidity so as to stiffen the base or render the same flexible as may be desired.

It is obvious that the parts may be otherwise arranged without departing from the essential features above described and shown.

What I claim as new and desire to secure by Letters Patent, is,—

1. A glider comprising relatively flexible portions, and a member carried by each portion and depending therefrom and provided with a curved gliding surface.

2. A glider comprising foot supporting sections, flexible means between the sections, a spring carried by the sections and supporting the flexible means, and knobs carried by the sections and provided with curved running surfaces.

3. A glider comprising foot engaging sections, flexible means connecting the sections, a spring supported by the sections and underlying said flexible means, and knobs carried by the sections and provided with substantially semi-spherical gliding surfaces.

In testimony whereof I affix my signature in presence of two witnesses.

CHARLES H. KOENIG.

Witnesses:
ALFRED POOLE, Sr.,
CHARLES NARSCHHAUSEN.